United States Patent
Kothandaraman et al.

(10) Patent No.: US 11,989,678 B2
(45) Date of Patent: May 21, 2024

(54) SYSTEM USING ARTIFICIAL INTELLIGENCE AND MACHINE LEARNING TO DETERMINE AN IMPACT OF AN INNOVATION ASSOCIATED WITH AN ENTERPRISE

(71) Applicant: Accenture Global Solutions Limited, Dublin (IE)

(72) Inventors: Ramkumar Kothandaraman, Bangalore (IN); Raghavan Tinniyam Iyer, Bangalore (IN); Puneet Kalra, Pune (IN); Bhavna Butani, Gurgaon (IN); Sudeep Sharma, Bangalore (IN); Ankita Kaushal, Bangalore (IN); Suja Jain, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 69 days.

(21) Appl. No.: 17/567,382

(22) Filed: Jan. 3, 2022

(65) Prior Publication Data

US 2022/0391814 A1 Dec. 8, 2022

(30) Foreign Application Priority Data

Jun. 3, 2021 (IN) .............................. 202141024719

(51) Int. Cl.
| | |
|---|---|
| *G06Q 10/06* | (2023.01) |
| *G06F 40/40* | (2020.01) |
| *G06N 20/20* | (2019.01) |
| *G06Q 10/0637* | (2023.01) |
| *G06Q 10/10* | (2023.01) |

(52) U.S. Cl.
CPC ....... *G06Q 10/06375* (2013.01); *G06F 40/40* (2020.01); *G06N 20/20* (2019.01)

(58) Field of Classification Search
CPC .............................. G06Q 10/06; G06Q 10/10
USPC ....................................................... 705/7.37
See application file for complete search history.

(56) References Cited

U.S. PATENT DOCUMENTS

| | | | | |
|---|---|---|---|---|
| 2011/0093309 A1* | 4/2011 | Dayasindhu | ........... | G06Q 10/06 705/7.28 |
| 2015/0294246 A1* | 10/2015 | Guven Kaya | .... | G06Q 10/06393 705/7.28 |
| 2018/0349817 A1* | 12/2018 | Goel | ...................... | G06N 5/046 |

* cited by examiner

*Primary Examiner* — Nga B Nguyen
(74) *Attorney, Agent, or Firm* — Harrity & Harrity, LLP

(57) ABSTRACT

In some implementations, a system may receive a submission associated with an innovation associated with an entity. The system may analyze, using a first machine learning model, the submission to identify a classification associated with the innovation. The system may analyze, using a second machine learning model in association with the classification, content of the submission to identify a characteristic of the innovation. The system may determine, using a third machine learning model and based on the characteristic, a ranking of the innovation relative to individual innovations in the subset of innovations. The system may determine, using a fourth machine learning model, an impact score associated with the innovation. The system may perform, based on the impact score satisfying a threshold, an action associated with a project involving the innovation.

20 Claims, 7 Drawing Sheets

SYSTEM USING ARTIFICIAL INTELLIGENCE AND MACHINE LEARNING TO DETERMINE AN IMPACT OF AN INNOVATION ASSOCIATED WITH AN ENTERPRISE

CROSS-REFERENCE TO RELATED APPLICATION

This Patent Application claims priority to Indian Patent Application No. 202141024719, filed on Jun. 3, 2021, and entitled "SYSTEM USING ARTIFICIAL INTELLIGENCE AND MACHINE LEARNING TO IDENTIFY AN IMPACT OF AN INNOVATION ASSOCIATED WITH AN ENTERPRISE." The disclosure of the prior Application is considered part of and is incorporated by reference into this Patent Application.

BACKGROUND

Organizations frequently receive submissions that describe innovations (and/or ideas that may inspire the innovations) to improve one or more operations associated with the organization. Typically, the greater the size of an organization and/or the more technological the organization, the more submissions and/or disclosures that the organization can expect to receive in a given time period. A representative (e.g., a manager and/or team leader) of the organization may be tasked with analyzing a submission and determining whether an innovation described in the submission should be pursued and/or adopted. This typically requires the representative to make estimations about the feasibility of the innovation, a complexity of the innovation, a likelihood of a success of implementing the innovation within a project, current and/or forecasted availability of resources to develop and/or manage a project involving the innovation, and so on. To make these estimations effectively, the representative must make certain judgments in order to predict a degree of an impact (whether positive or negative) that the innovation and/or a corresponding project may have on the organization.

SUMMARY

Some implementations described herein relate to a non-transitory computer-readable medium that stores a set of instructions for a device. The set of instructions, when executed by one or more processors of the device, may cause the device to receive a submission associated with an innovation associated with an entity. The set of instructions, when executed by one or more processors of the device, may cause the device to determine, based on the submission, a classification of the innovation. The set of instructions, when executed by one or more processors of the device, may cause the device to analyze, using a content analysis model and in association with the classification, the submission to identify a characteristic of the innovation. The set of instructions, when executed by one or more processors of the device, may cause the device to determine, using an impact analysis model, an impact score associated with the innovation, wherein the impact score is determined based on the ranking and an impact parameter associated with the classification. The set of instructions, when executed by one or more processors of the device, may cause the device to perform an action associated with the innovation.

Some implementations described herein relate to a method. The method may include receiving, by a device, a submission associated with an innovation associated with an entity. The method may include analyzing, by the device and using a first machine learning model, the submission to identify a classification associated with the innovation, wherein the first machine learning model is trained based on historical data associated with a plurality of innovations that are associated with the entity. The method may include analyzing, by the device and using a second machine learning model in association with the classification, content of the submission to identify a characteristic of the innovation, wherein the second machine learning model is trained based on a subset of the historical data that is associated with a subset of the plurality of innovations that are associated with the classification. The method may include determining, by the device and using a third machine learning model and based on the characteristic, a ranking of the innovation relative to individual innovations in the subset of innovations. The method may include determining, by the device and using a fourth machine learning model, an impact score associated with the innovation, wherein the impact score is determined based on the ranking and an impact parameter associated with the classification. The method may include performing, by the device and based on the impact score satisfying a threshold, an action associated with a project involving the innovation.

Some implementations described herein relate to a device. The device may include one or more memories and one or more processors coupled to the one or more memories. The device may be configured to receive a submission associated with an innovation associated with an entity. The device may be configured to analyze, using a first machine learning model, the submission to identify a classification associated with the innovation. The device may be configured to analyze, using a second machine learning model in association with the classification, content of the submission to identify a characteristic of the innovation. The device may be configured to determine, using a third machine learning model and based on the characteristic, a ranking of the innovation relative to a set of innovations. The device may be configured to determine, using a fourth machine learning model, an impact score associated with the innovation. The device may be configured to perform, based on the impact score satisfying a threshold, an action associated with a project involving the innovation.

DETAILED DESCRIPTION

Figure 1A:
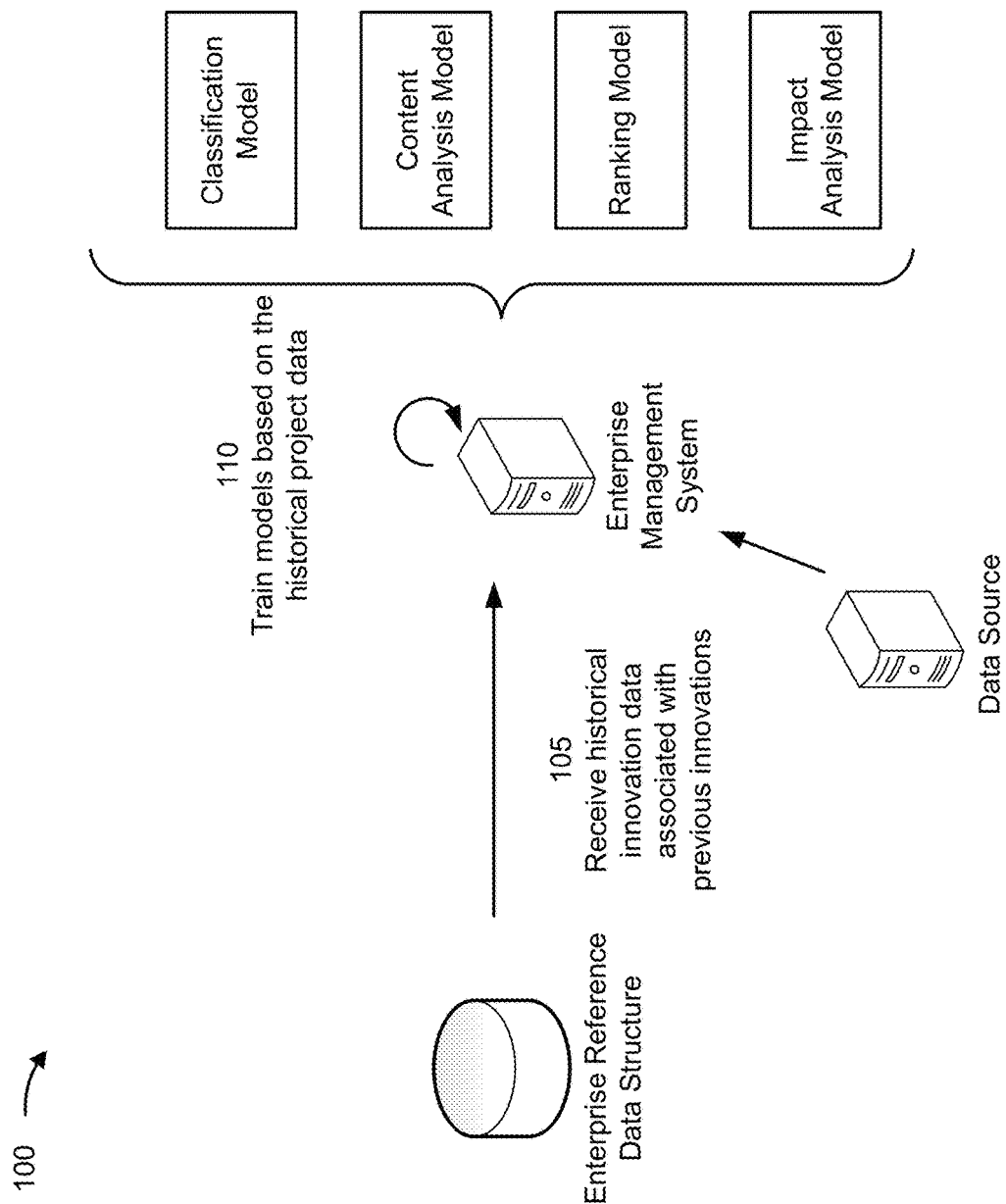
FIGS. 1A-1C are diagrams of an example implementation associated with determining an impact of an innovation, as described herein.

The following detailed description of example implementations refers to the accompanying drawings. The same reference numbers in different drawings may identify the same or similar elements.

In many instances, an enterprise is tasked with identifying ideas, processing ideas and/or innovations associated with the ideas, assembling a team to manage or work on development of a project for the innovation, and/or integrating the team and/or technologies that may be utilized to develop the project. For example, an enterprise may receive a submission from a contributor (e.g., an employee or partner) of the enterprise, analyze the submission, and determine whether to develop and manage a project based on the submission (and/or the idea or innovation described in the submission). The project may be developed and/or managed in order to improve an operation of the enterprise, update or improve a service or product, and/or facilitate creation of a new service and/or a new product. However, a rate of submissions of new ideas or innovations may exceed a rate at which the enterprise can analyze and/or select ideas or innovations that should be developed into projects, and/or ultimately into services or products. Accordingly, the enterprise may experience delays in identifying, selecting, and/or implementing certain processes to develop a project based on an innovation that can improve the enterprise. Such delays can degrade an overall performance of the enterprise, depending on the impact of implementing certain processes that are involved with adopting the innovation. Furthermore, individual contributors or other representatives of the enterprise may be unaware of certain ongoing projects associated with innovations, and, therefore, unable to contribute to such innovations.

Some implementations described herein provide an enterprise management system that is configured to identify, analyze, select, and/or facilitate generation and/or management of an innovation for an enterprise. The enterprise management system may perform an analysis (e.g., using one or more models described herein) on content and/or one or more characteristics of a submission associated with an innovation (e.g., a description of an innovation described in the submission) and determine an impact score for the innovation based on the analysis. The enterprise management system may determine collaboration information associated with the individuals that may be involved in the innovation and/or select the submission to be implemented as a project based on the impact score satisfying a threshold. The impact score may be determined based on the individuals that may be involved in the innovation. The impact score may be indicative of or correspond to a probability or likelihood that the innovation will be a success for the enterprise (e.g., improves one or more operations or performance metrics of the enterprise).

Furthermore, the enterprise management system may facilitate development and/or management of a project associated with the innovation, integration of contributors to the project, and/or status updates to the innovation to enable other contributors or individuals associated with the enterprise to access information associated with the innovation and/or further contribute to the innovation or other innovations associated with the enterprise.

In some implementations, the enterprise management system may utilize and/or select one more models to analyze data or information associated with a submission or innovation, as described herein. The enterprise management system may utilize a classification model to classify submissions and/or innovations according to a certain characteristic and/or technique. The enterprise management system may utilize an impact analysis model that may offer suggestions associated with whether to proceed with development of an innovation associated with a submission based on an analysis of the submission. The suggestions may be provided as feedback to contributors of the submission or other individuals associated with the enterprise (e.g., contributors or other employees/representatives of the enterprise). The impact analysis model, as described herein, may provide recommendations to users based on innovation similarities or user interaction history associated with previous innovations.

In this way, the enterprise management system may utilize one or more machine learning models to perform one or more operations or processes, as described herein. Further, as described herein, the enterprise management system may provide a centralized system that facilitates generation and/or management of an innovation of an enterprise. Accordingly, the enterprise management system may handle thousands, millions, or more submissions associated with innovations within a period of time (e.g., daily, weekly, monthly) (e.g., in order to provide big data processing capability). Furthermore, relative to previous techniques, the enterprise management system reduces a likelihood of mistakenly making incorrect impact or value estimations, based on incorrect complexity estimations, incorrect project resource requirement estimations, incorrect project resource allocations, incorrect market analysis estimations, among other examples. Correspondingly, the enterprise management system conserves computing resources, networking resources, and/or the like that would otherwise be wasted on incorrect or suboptimal innovation analyses and/or project developments, and/or that would otherwise be wasted on developing a low-value or negative impact innovation into a project.

Figure 1B:
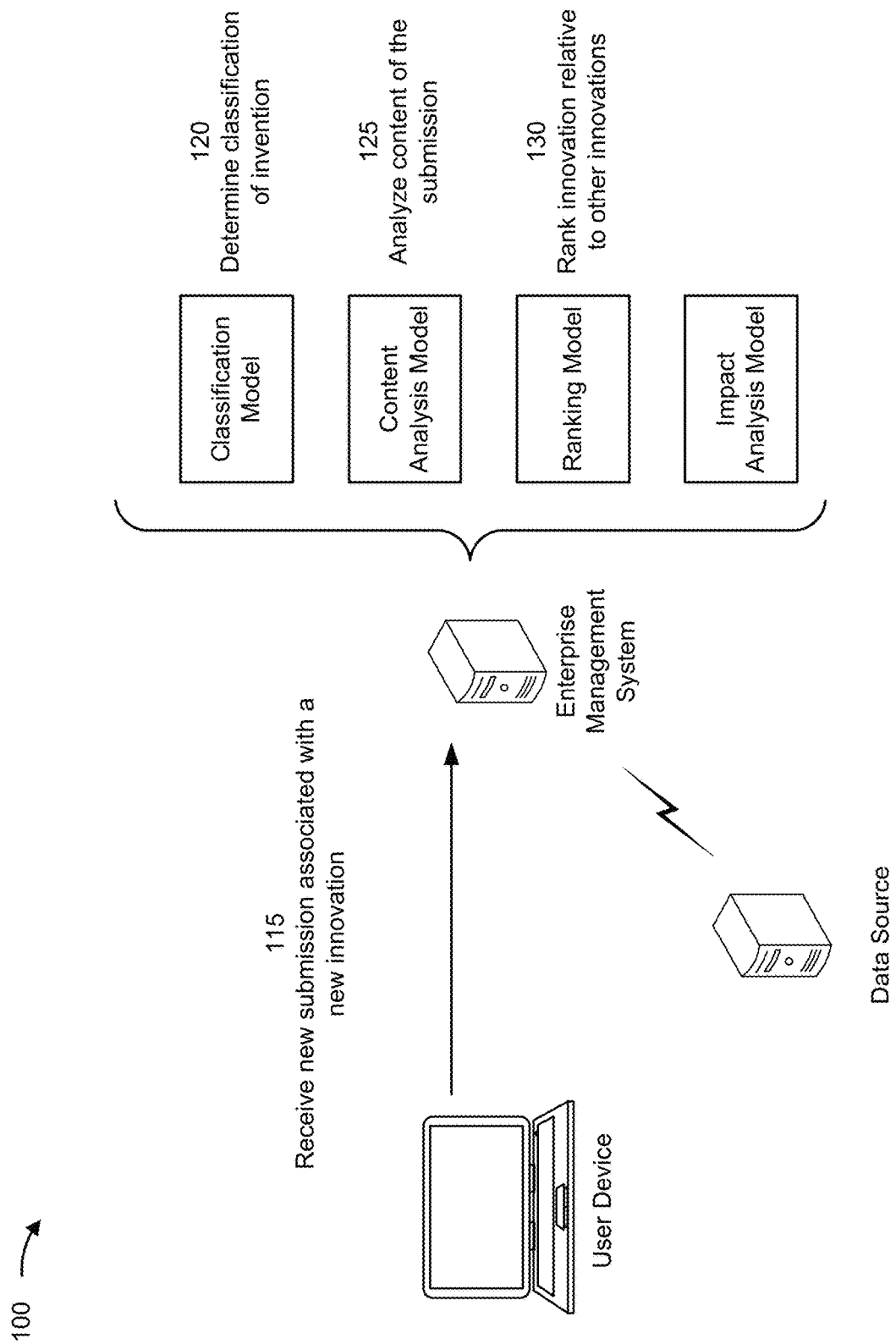
Figure 1C:
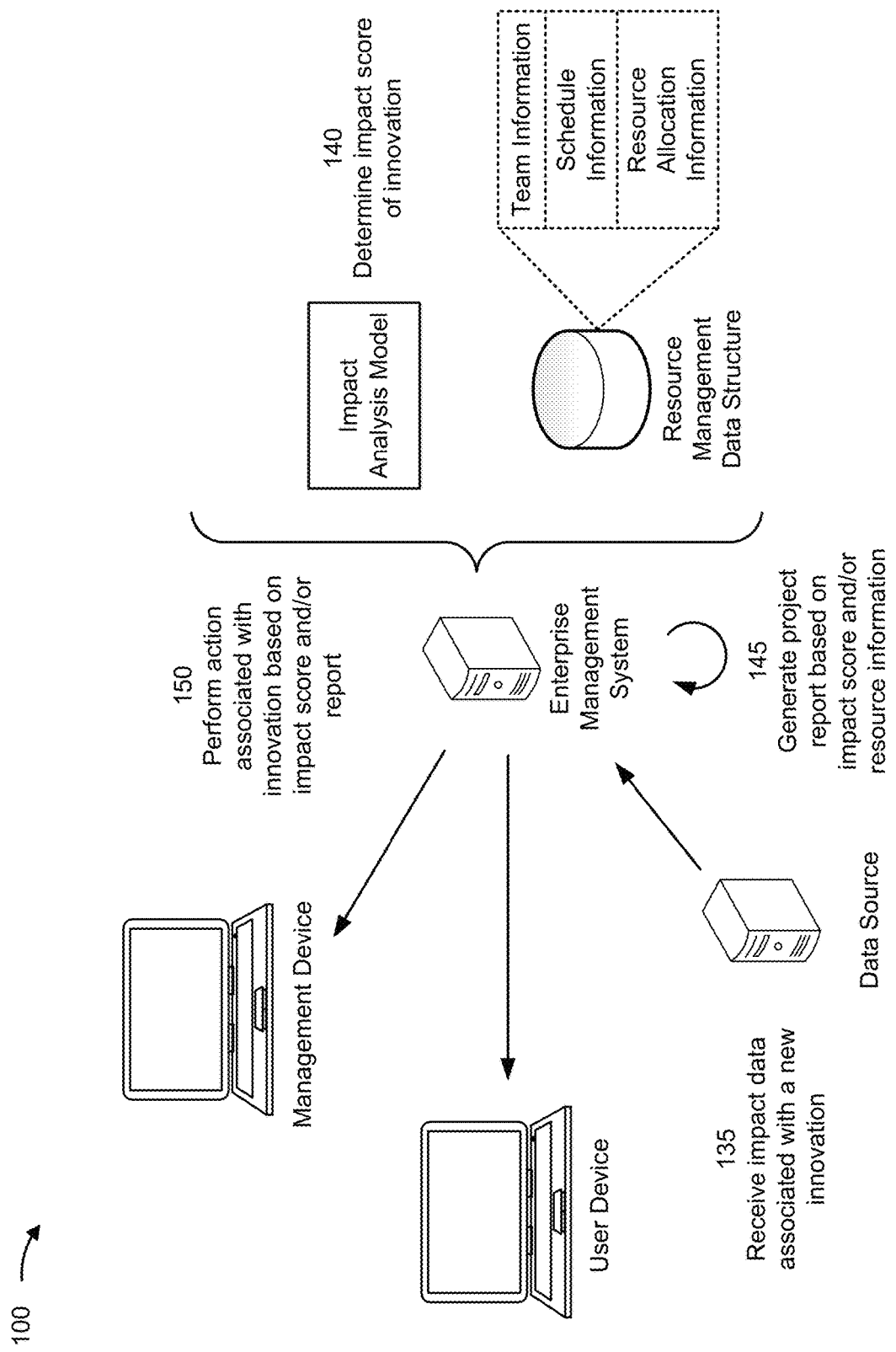

FIGS. 1A-1C are diagrams of an example implementation 100 associated with associated with determining an impact of an innovation, as described herein. As shown, example implementation 100 includes an enterprise management system, a user device, a management device, and a data source. These devices are described in more detail below in connection with FIG. 4.

As shown, the enterprise management system may include one or more machine learning models. For example, the enterprise management system may include a classification model, a content analysis model, a ranking model, and/or an impact analysis model. The enterprise management system may be associated with an entity, such as an enterprise or individual that receives submissions associated with innovations that are contributed in association with one or more operations of the entity.

As shown in FIG. 1A, and by reference number 105, the enterprise management system may receive historical innovation data associated with previous innovations. In some implementations, the enterprise management system may receive the historical innovation data from the enterprise reference data structure and/or one or more devices associated with the enterprise reference data structure (e.g., one or more devices, associated with an entity, that utilize and/or provide submissions associated with innovations).

The enterprise reference data structure may include any suitable data structure (e.g., a database, a table, a list, a task graph, and/or the like) associated with the enterprise management system. The historical data may include and/or be associated with submissions that are associated with the previous innovations. The submissions may come in various forms. For example, the submissions may be included within one or more types of files, such as one or more text files, one or more document files, and/or one or more media files (e.g., image files, audio files, and/or video files), or other types of files that may be associated with one or more applications.

In some implementations, the historical innovation data may include thousands, millions, billions, etc. of data points associated with previous innovations (e.g., previous innovations that are associated with an entity associated with the enterprise management system). For example, the data points may correspond to information identifying previous innovations (e.g., innovations that have been previously described in previous submissions and/or previously developed into projects), content (e.g., descriptions of subject matter) associated with the previous innovations (e.g., information associated with classifications of the previous innovations, such as a field of the innovation, whether for internal/external use, whether a product and/or service, or other types of classifications), information relating to tests that were performed to validate that the previous innovations were successfully (or unsuccessfully) developed into projects and/or incorporated into projects (e.g., according to a project development metric and/or a project performance metric), resources that were allocated for the innovations and/or consumed in association with the projects, team information associated with the previous innovations and/or projects (e.g., identification of team members, respective skill sets of the team members, respective experience levels of the team members, and/or the like), submission dates for submissions for the previous innovations, iteration and/or version information associated with the submissions titles, number of iterations and/or versions, and/or number of tasks associated with the previous innovations and/or projects, among other examples.

According to some implementations, the historical innovation data may be specific to a particular class of innovation. For example, the historical data may be associated with and/or include information for a set of innovations involving a particular field of technology, a set of innovations for internal use (e.g., within an enterprise), a set of innovations for external users (e.g., for customers or associates), a set of innovations for a particular type of product, a set of innovations for a particular type of service, and so on. The historical data, for an individual innovation, may include submission information (e.g., information that identifies the submission, data associated with the submission, a quantity of information in the submission, any related submissions or innovations associated with the submission) associated with the innovation, historical project information (e.g., project development information, project release information, and/or project impact information) associated with a historical project developed in association with the innovation, and/or resource information (e.g., indications of allocated and/or utilized resources) associated with a development of the historical project.

As a more specific example, for a software innovation, the historical data may include respective information associated with a related software product, individual features (e.g., capabilities, user interface elements, functions, operations, and/or the like) of the software innovation, and/or individual modules or components associated with the software innovation (e.g., an application, a user interface, and/or a communication interface). In this way, when information for a new innovation associated with the innovation is received (e.g., a submission that describes the new innovation), as described herein, the enterprise management system (and/or the machine learning model) has access to historical data that is specific to that innovation and/or classification of innovation.

Additionally, or alternatively, the historical innovation data may be specific to a particular team and/or a particular set of resources. For example, the historical innovation data may be associated with innovations and/or projects involving a particular entity (e.g., company, organization, and/or the like), a particular department of the entity (e.g., a product development department, a service development department, an operations department, a sales department, and so on), a particular team within a department (e.g., a team associated with a particular product or service), a particular individual of a team, and/or a particular set of available or utilized resources for projects associated with the innovations (e.g., quantities and/or types of equipment or assets, such as computing devices, mechanical devices, manufacturing machines, real estate, and/or the like). In this way, when a submission associated with a new innovation that is associated with a particular team or that may involve a particular set of resources is received, as described herein, the enterprise management system (and/or a machine learning model of the enterprise management system) has access to historical data that is specific to the particular team and/or the particular set of resources. In this way, the enterprise management system may receive the historical innovation data to permit the enterprise management system to develop and/or train one or more models according to the historical innovation data.

As further shown in FIG. 1A, and by reference number 110, the enterprise management system trains the one or more models based on the historical data. For example, the enterprise management system may train one or more of the classification model, the content analysis model, the ranking model, or the impact analysis model according to any suitable technique.

In some implementations, the enterprise management system may perform a data preprocessing operation when generating training data for one or more of the models. For example, the enterprise management system may preprocess data (e.g., data that includes a description of an innovation that may be included within a document, a message, a form, a program code) to remove non-ASCII characters, white spaces, confidential data, irrelevant data, or the like. Additionally, or alternatively, the enterprise management system may perform a tokenizing technique, convert particular words to vectors, and/or the like. In this way, the enterprise management system may organize thousands, millions, or billions of data items in the enterprise reference data structure for machine learning and/or model generation.

In some implementations, the enterprise management system may perform a training operation when generating the machine learning model with the historical innovation data. For example, the enterprise management system may portion historical innovation data into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the enterprise management system may preprocess and/or perform dimensionality reduction to reduce the historical innovation data to a minimum feature set (e.g., a feature set that is associated with a particular product, a particular team, and/or a particular set of resources). In some implementations, the enterprise management system may train the machine learning model on this minimum feature set, thereby reducing processing to train the machine learning model, and may apply a classification technique to the minimum feature set (e.g., to classify the minimum feature set as being associated with a particular product, a particular team, and/or a particular set of resources).

The enterprise management system may include and/or utilize a classification model. The classification model may be trained, and/or configured, to classify an innovation associated with a submission into one or more categories described herein. In some implementations, the classification model may utilize one or more classification techniques, such as a logistic regression classification technique, a random forest classification technique, a gradient boosting machine learning (GBM) technique, a Naïve Bayesian technique, and/or a bagging technique. In some implementations, based on one or more parameters of the historical innovation data, the enterprise management system may utilize one or more classifiers and/or one or more of the techniques to generate a classified and/or mapped set of training data.

The enterprise management system may include and/or utilize a content analysis model. The content analysis model may include or utilize a deep learning technique and/or one or more layer algorithms, such as a convolutional neural network or other similar deep learning model. The content analysis model may be configured to generate a feature map that summarizes and/or identifies detected features of the submission (and/or features of the innovation extracted from the description of the innovation). The content analysis model may be trained and/or configured to analyze a submission using a natural language processing technique, a semantic analysis technique, or a sentiment analysis technique. In this way, the content analysis model may be trained based on the classification and/or features of an innovation that are identified using the natural language processing technique, the semantic analysis technique, and/or the sentiment analysis technique.

The enterprise management system may include a ranking model. The ranking model may be configured to rank and/or determine a ranking of an innovation according to a particular scoring system and/or schema as described herein. The ranking model may be trained to identify one or more weights for certain parameters that are associated with a classification of an innovation.

The enterprise management system may include an impact analysis model that is configured to determine an impact score associated with an innovation. For example, the impact analysis model may determine the impact score based on a particular scoring system and/or schema that is indicative of a value or contribution that an innovation may have on a particular enterprise or entity associated with the enterprise.

Accordingly, the enterprise management system may use any number of artificial intelligence techniques, machine learning techniques, deep learning techniques, and/or the like to train and/or utilize a machine learning model for use in analyzing an innovation and/or a project associated with the innovation, as described herein.

As shown in FIG. 1B, and by reference number 115, the enterprise management system receives a new submission associated with a new innovation. For example, as shown, the submission may be received from a user device that was used to produce and/or generate the submission (e.g., based on one or more user inputs). The submission may include or correspond to a description of the new innovation. In some implementations, the enterprise management system may store the submission in a data structure of the enterprise management system. Although some of the following examples are discussed in connection with a single new innovation, the submission may be associated with a plurality of innovations (e.g., a plurality of separable, but related, innovations). In such cases, the plurality of innovations may be associated with a same project (e.g., a same operation, a same product or service, a same entity, such as a same contributor or team).

According to some implementations, the submission may be received as structured data. For example, the submission may be received as an innovation description that is sorted or organized according to particular information associated with a complexity and/or a size of an innovation. More specifically, the submission may be received as a series of inputs that are provided using a user interface (e.g., a user interface of a submission portal associated with an online portal, a web interface, and/or an application interface). In such cases, the user interface may be configured to prompt a user to provide the innovation description in response to a plurality of requests and/or queries for specific information associated with the innovation that is correspondingly identified within the submission. For example, to provide information on a type of the new innovation, the prompts may request the user to provide information indicating the field or use of the new innovation (e.g., software, construction, manufacturing, design, presentation, and/or the like), subject matter of the new innovation, specifics on a configuration of the new innovation (e.g., a structure of physical components of a construction innovation, whether the innovation includes a plurality of moving or cooperating parts, relationships between the moving or cooperating parts, and/or the like), non-functional elements of the new innovation (e.g., compliance requirements, standards requirements, policy requirements, safety requirements, and/or the like), timeliness requirements (e.g., a requested release schedule for public disclosure of the innovation that includes dates or times of completion for particular tasks or subtasks), and/or the like.

Additionally, or alternatively, to provide information on a size of a new project associated with the innovation, the prompts may request the user to provide information on a quantity of material (e.g., metals, substrates, plastics, wood, and/or the like) or components required for the project (e.g., computing devices, mechanical devices, machines, vehicles, and/or the like), a quantity of different types of materials or different types of components, a physical size associated with a component of the new project (e.g., a height of a building, dimensions of a product of manufacture, and/or the like), a quantity of tasks or subtasks for the new project (e.g., a number of operations that are to be performed), a quantity of different types of tasks or subtasks for the new project, and/or the like.

In this way, the enterprise management system may receive a submission for a new innovation to permit the enterprise management system to process and/or analyze (e.g., using natural language processing) the submission and determine an impact of the innovation.

As further shown in FIG. 1B, and by reference number 120, the enterprise management system may determine a classification of the innovation. For example, the enterprise management system may utilize the trained classification model to classify the innovation according to one or more categories described herein (e.g., categories learned during a training of the classification model).

In some implementations, the classification model may include and/or utilize a Naïve Bayesian model for categorizing unstructured data of the submission. The classification model may include a bagging model for generating one or more classification and regression trees (CARTs) (or decisions trees) associated with the submission and/or a random forest model associated with the one or more CARTs. In some implementations, the classification model may include a bagging classifier model (e.g., an ensemble meta-estimator) to fit base classifiers on subsets of the original historical innovation data (e.g., subsets of the submissions) and form a prediction based on an aggregate of individual predictions associated with the subsets.

As further shown in FIG. 1B, and by reference number 125, the enterprise management system analyzes content of the submission. For example, the enterprise management system may utilize the trained content analysis model to analyze content of the submission, such as a description of the innovation, an identifier of a contributor of the submission, a time or location associated with the submission, an entity associated with the submission, or the like.

One or more portions of the submission (e.g., information in a document or text field) may be received as unstructured data that includes and/or indicates a description that describes the innovation. For example, the submission may include text data, image data, audio data, video data, and/or the like that includes any or all of the information described above. The submission may be received within a message (e.g., an email, a text message, a text input, and/or the like), and/or a file (e.g., a text document, an uploaded file, an attachment, and/or the like). The submission may undergo one or more preprocessing techniques (e.g., an optical character recognition (OCR) technique, an image enhancement technique, a speech-to-text (STT) technique, and/or the like) to identify and/or process content within the description (e.g., using natural language processing, a semantic analysis, and/or a sentiment analysis).

In some implementations, the enterprise management system may utilize a natural language processing technique, a computational linguistics technique, a text analysis technique, and/or the like, with the submission in order to make the submission analyzable (e.g., for processing via the ranking model). The natural language processing may include a bag-of-words processing technique, a K-means clustering technique, or any other type of natural language processing technique. The enterprise management system may apply natural language processing to interpret content in the submission and generate additional information (e.g., impact information, project information, team information, and/or the like) associated with the potential meaning of the content within the submission.

In this way, the enterprise management system may utilize natural language processing to analyze, understand, and derive meaning from human language in a useful way. For example, the enterprise management system may utilize the natural language processing for automatic text summarization, sentiment analysis, topic extraction, named entity recognition, parts-of-speech tagging, relationship extraction, stemming, and/or the like. In this way, the processed submission may include the submission provided in a format (e.g., an electronic or machine-encoded format) that can be understood by the trained ranking model, impact analysis model, or other downstream model associated with the enterprise management system.

As described herein, the enterprise management system may parse natural language descriptions of the innovation. Accordingly, the enterprise management system may obtain data identifying, in natural language, a description of the innovation, and may parse the data to identify potential project requirements for a project associated with the innovation. The parsed data may be used to extract features associated with the innovation that include one or more requirements of implementing the innovation (e.g., via a project). In some implementations, if the enterprise management system (e.g., via the natural language processing) cannot identify or determine information of a description of the innovation, the enterprise management system may prompt the user device to clarify and/or resubmit the submission or description of the innovation.

As further shown in FIG. 1B, and by reference number 130, the enterprise management system ranks the innovation relative to other innovations. For example, the enterprise management system may rank the innovation based on scores associated with features of the innovation and the other innovations. The innovation and the other innovations may be associated with a same classification that was identified by the classification model. In this way, the enterprise management system may compare the innovation to other innovations that are related to the innovation based on being within a same classification. As described herein, the classification may be specific and/or particular to an entity associated with the enterprise management system. As described herein, the enterprise management system may determine a ranking score for the innovation (and other innovations) using a scoring system as described elsewhere herein.

As shown in FIG. 1C, and by reference number 135, the enterprise management system may receive impact data associated with the new innovation. For example, the enterprise management system may request and/or search through a data source (e.g., using a search engine and/or a query) to obtain impact data associated with one or more impact parameters associated with the innovation. The data source may correspond to any source of information, such as an online platform, a newsfeed, or the like. The data source and/or an impact parameter received from the data source may be specific to a particular classification. Accordingly, based on the classification of the innovation, as identified by the classification model, the enterprise management system may obtain an impact parameter (or a value of the impact parameter) from the data source.

As a more specific example, the impact parameter may correspond to market information associated with a particular field of an innovation. In such a case, the field may correspond to the classification of the innovation. If the field is a particular software field, the impact parameter may include a value for market information (e.g., market share associated with the entity, potential available market share, or the like) associated with the field. Other types of impact parameters may include margin information associated with products or services in the field, size of a targeted customer or client base in the field, efficiency metrics for the field, and so on.

As further shown in FIG. 1C, and by reference number 140, the enterprise management system may determine an impact score of the innovation. For example, the enterprise management system, using the impact analysis model, may determine the impact score based on at least one of the classification identified by the classification model, features or characteristics identified by the content analysis model, and/or the ranking determined by the ranking model.

To determine a score associated with a ranking and/or impact of an innovation, the enterprise management system may determine the score based on identified characteristics of the innovation, such as characteristics described in the submission. Using such a scoring system, the enterprise management system can apply weights (w) (e.g., weights learned by the ranking model or impact analysis model during training) to parameters corresponding to the characteristics of the innovations (e.g., classification, features, contributors that submitted the innovations, and so on). Accordingly, the enterprise management system can determine (e.g., via one or more calculations associated with the scoring system) scores for a set of innovations (e.g., to rank them) or an impact of an innovation that is representative of a value of the innovation or a project associated with the innovation. As an example, the enterprise management system can use the following to determine the score ($s_{ij}$) based on three characteristics a, b, c of an innovation i for an entity j:

$$s_{ij} = w_{aj}a_i + w_{bj}b_i + w_{cj}c_i \qquad (1)$$

where $w_{aj}$, $w_{bj}$, $w_{cj}$ correspond to adjusted weights based on the relevance to the entity j for parameters $a_i$, $b_i$, $c_i$, which correspond to the characteristics of the innovation i. The parameters $a_i$, $b_i$, $c_i$ may include a value (e.g., a characteristic-specific score) associated with a scale for the respective characteristics associated with parameters $a_i$, $b_i$, $c_i$. Additionally, or alternatively, the adjusted weights $w_{aj}$, $w_{bj}$, $w_{cj}$ may be normalized (e.g., where $0 \leq w_{aj}$, $w_{bj}$, $w_{cj} \leq 1$ and $w_{aj} + w_{bj} + w_{cj} = 1$).

The enterprise management system may utilize the impact analysis model (e.g., to indicate a potential for success and/or an enterprise benefit score that is indicative of an impact on the enterprise or an entity associated with the enterprise). As described elsewhere herein, prior to identifying and/or selecting a model to identify a relationship and/or impact of variables of a submission or innovation, the impact analysis model may receive data and/or analyze the data. In some implementations, the data may be pre-processed in association with a classification, content analysis, feature engineering, and/or extraction analysis.

The impact score may be indicative of a likelihood of a success of a project that is developed in association with the innovation. As described herein, the impact analysis model may be trained based on hundreds, thousands, or millions of iterations of analyzing innovation submissions and/or developing the innovations into projects. In this way, the impact analysis model may objectively determine, as described herein, an impact that the innovation is likely to have on an enterprise.

As further shown in FIG. 1C, and by reference number 145, the enterprise management system may generate a report based on an impact score and/or resource information. For example, the enterprise management system may utilize a resource management data structure to identify team information associated with members that can work on a project involving the innovation (e.g., based on a field of expertise that aligns with a classification of the invention), schedule information associated with releasing the project, and/or resource allocation information that indicates which resources of the enterprise (or an entity of the enterprise) are available for a project involving the innovation. The enterprise management system may generate the report as described below at least in connection with FIG. 2.

As further shown in FIG. 1C, and by reference number 150, the enterprise management system performs an action associated with the innovation based on the impact score and/or the report. For example, the enterprise management system may indicate, via a user interface of the enterprise management system, the impact score in association with an identifier for a project associated with the innovation. In such a case, the enterprise management system may assign the project the identifier in order to enable the project to be identified. The user interface may correspond to a user interface of an application associated with the enterprise management system. In this way, a user (e.g., a contributor of the submission and/or other representatives of the enterprise) may view and/or access information associated with the project (e.g., to solicit additional information, to request assistance with the project, to indicate that the project is available to be developed and/or managed, and so on).

In some implementations, the enterprise management system may provide project information, associated with the project, to the user device and/or a management device. The project information may identify the classification, the characteristic, the ranking, and/or the impact score associated with the innovation. In this way, a contributor associated with the user device may obtain feedback on the submission. Additionally, or alternatively, a manager of the enterprise that is associated with the management device may receive a notification that a submission has been submitted that satisfies a threshold impact score to enable or facilitate development of the project as quickly as possible.

The enterprise management system may provide the generated report to the management device and/or a resource associated with the enterprise (e.g., an available resource that is to facilitate development and/or management of the project). In some implementations, the enterprise management system may provide the report with a means to continually measure and monitor performance of the project in association with the submission or innovation. The enterprise management system may develop or set a baseline against which future iterations of the project can be measured (e.g., in association with analyzing subsequent submissions for other innovations). The model may be iteratively updated and/or retrained over time as certain variables change and/or are updated.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
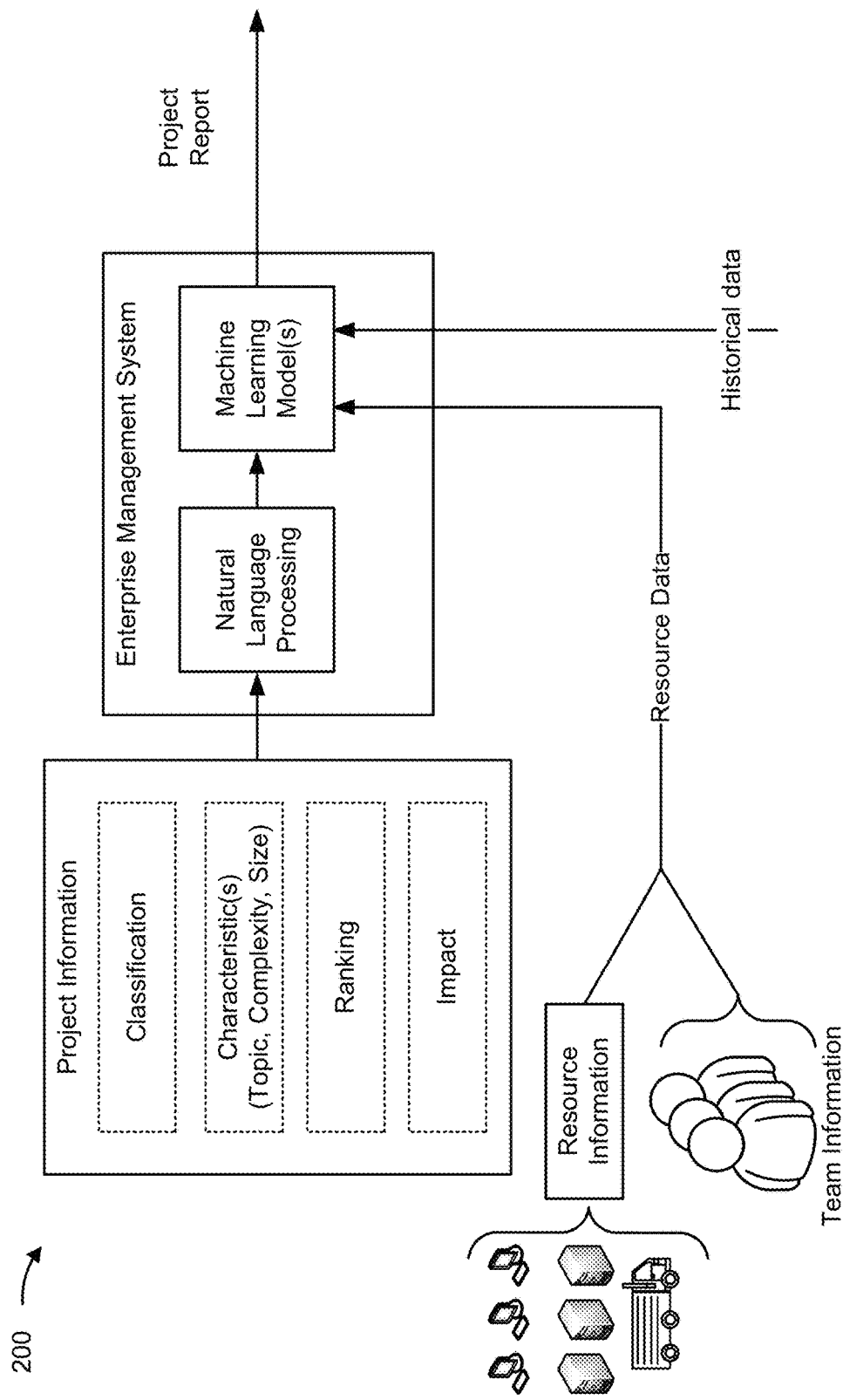
FIG. 2 is a diagram of an example implementation associated with developing a project associated with an innovation as described herein.

FIG. 2 is a diagram of an example implementation 200 associated with developing a project associated with an innovation. As shown in FIG. 2, example implementation 200 includes an enterprise management system that includes a natural language processing module and one or more machine learning models. The enterprise management system may receive project information associated with an innovation that identifies a classification of the innovation, one or more characteristics of the innovation (e.g., a topic, a complexity, a size, or the like), a ranking of the innovation (e.g., relative to other innovations), and an impact associated with the innovation). Additionally, or alternatively, the enterprise management system may receive resource information and/or team information. Based on the project information, the resource information, and the team information, and historical data (e.g., associated with previous innovations and/or projects associated with an entity that is associated with the enterprise management system) the enterprise management system may generate a project report to facilitate development and/or management of a project associated with the innovation.

The enterprise management system may collect and/or maintain the project information, the resource information, the team information, and/or the historical data information from a variety of sources within a reference data structure to provide a centralized location of complete, accurate, and relevant information associated with analyzing an innovation in connection with development of a project. As described herein, the enterprise management system may utilize one or more machine learning models to analyze and/or compare information of a submission with one or more previous sets of information associated with previous submissions or previous innovations, select the most relevant information for a submission and/or innovation from a reference data structure, determine an optimal integration of an innovation for a submission, and/or facilitate management of a project associated with the innovation.

In some implementations, the report may include other information associated with the innovation, such as details and/or indications (e.g., links, websites, uniform resource locators (URLs), or the like) to resources and/or content (blog articles, news articles, and/or documents links associated with related technologies, a related market, or other types of information) that is associated with the innovation or a characteristic (e.g., a technology, a market, a field, a tool, equipment, or the like) of the innovation. In this way, the enterprise management system may generate a report that enables a user (e.g., a contributor of the innovation, another contributing representative of the enterprise, and/or a team manager of the enterprise) and/or a system to quickly and easily obtain additional or related information associated with an innovation (e.g., learned or identified based on information in the reference data structure and/or that is associated with other related projects or innovations) and/or further contribute to, develop, and/or enhance the innovation.

In some implementations, the enterprise management system may engage in a model engineering process that involves a model selection for analyzing a submission and/or innovation described in the submission. The enterprise management system may compare individual models (from a set of available classification models and/or a set of available content analysis models) that involve different sets of predictors in order to select a best performing model (e.g., an optimal model and/or a model that minimizes a prediction error). For example, the enterprise management system may utilize a certain content analysis model and/or involve a certain type of analysis based on a classification of the innovation.

Additionally, or alternatively, the enterprise management system may select from a variety of types of models for a particular model described herein. In some implementations, the enterprise management system may utilize a regression regularization technique for a dataset that involves a relatively high dimensionality and/or multicolinearity among variables in the dataset. The enterprise management system may utilize a linear model selection that involves a best subset regression and/or stepwise regression. The enterprise management system may select a model for an analysis based on a learning objective and/or certain data requirements. In this way, the enterprise management system may identify requirements for a selected innovation's analysis and/or development into a project.

A machine learning technique of the enterprise management system (e.g., to provide the project report as a recommendation for developing and/or managing a project) may involve a content-based technique and/or a collaborative-based technique. The content-based technique may be based on a similarity of attributes of a submission or innovation, and the collaborative-based technique may calculate similarities from interactions of contributors for a submission or innovation. An input may be received from a classification model output, a database, and/or a reference data structure, and the machine learning model may provide corresponding recommendations to the users (e.g., recommendations based on previous submissions or innovations). In this way, the enterprise management system (e.g., via a recommendation) may indicate, to a user, an impact score for a submission or other relative information associated with the submission or innovation (e.g., a competition price range, a related technological solution, an allocation of resources for the innovation, and so on). In some implementations, the output of the machine learning model may be displayed to a user or provided as an input to an impact analysis model of the enterprise management system.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
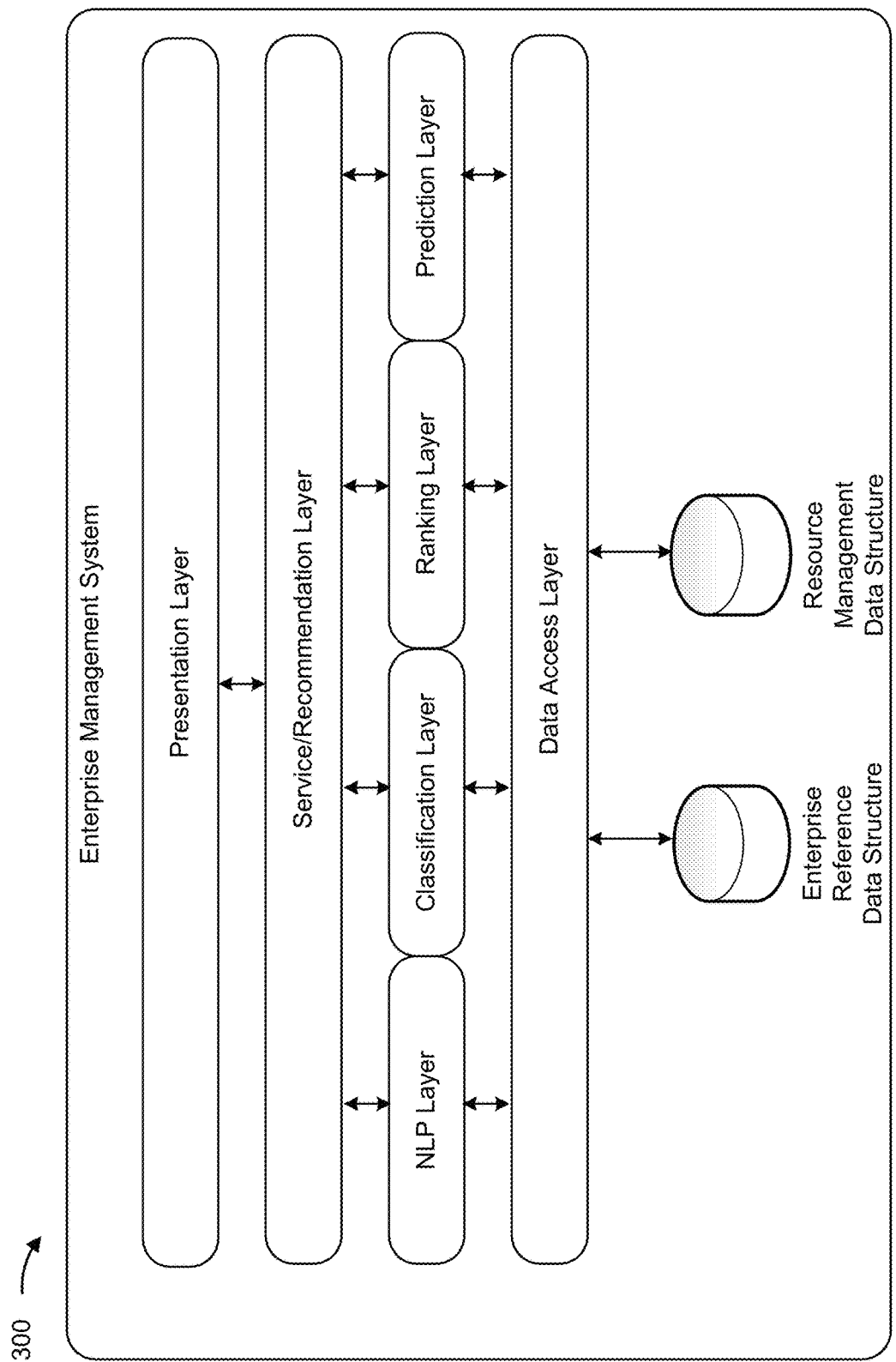
FIG. 3 is a diagram of an example implementation of an enterprise management system described herein.

FIG. 3 is a diagram of an example implementation 300 associated with an enterprise management system described herein. Example implementation 300 includes an example data architecture of the enterprise management system. As shown, the enterprise management system includes a presentation layer, a service/recommendation layer, a natural language processing layer, a classification layer, a ranking layer, a prediction layer, a data access layer, an enterprise reference data structure, and a resource management data structure.

The presentation layer may enable user interaction and/or may serve as a user interface to permit a user to access or view a submission for an innovation and/or a report for a project associated with an innovation. The service/recommendation layer corresponds to an integration layer that is to generate the report according to the natural language processing layer, the classification layer, the ranking layer, and/or the prediction layer, one or more of which may be configured to implement one or more of the classification model, the content analysis model, the ranking model, and/or the impact analysis model described herein. The data access layer serves as an interface with the enterprise reference data structure and/or the resource management data structure.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
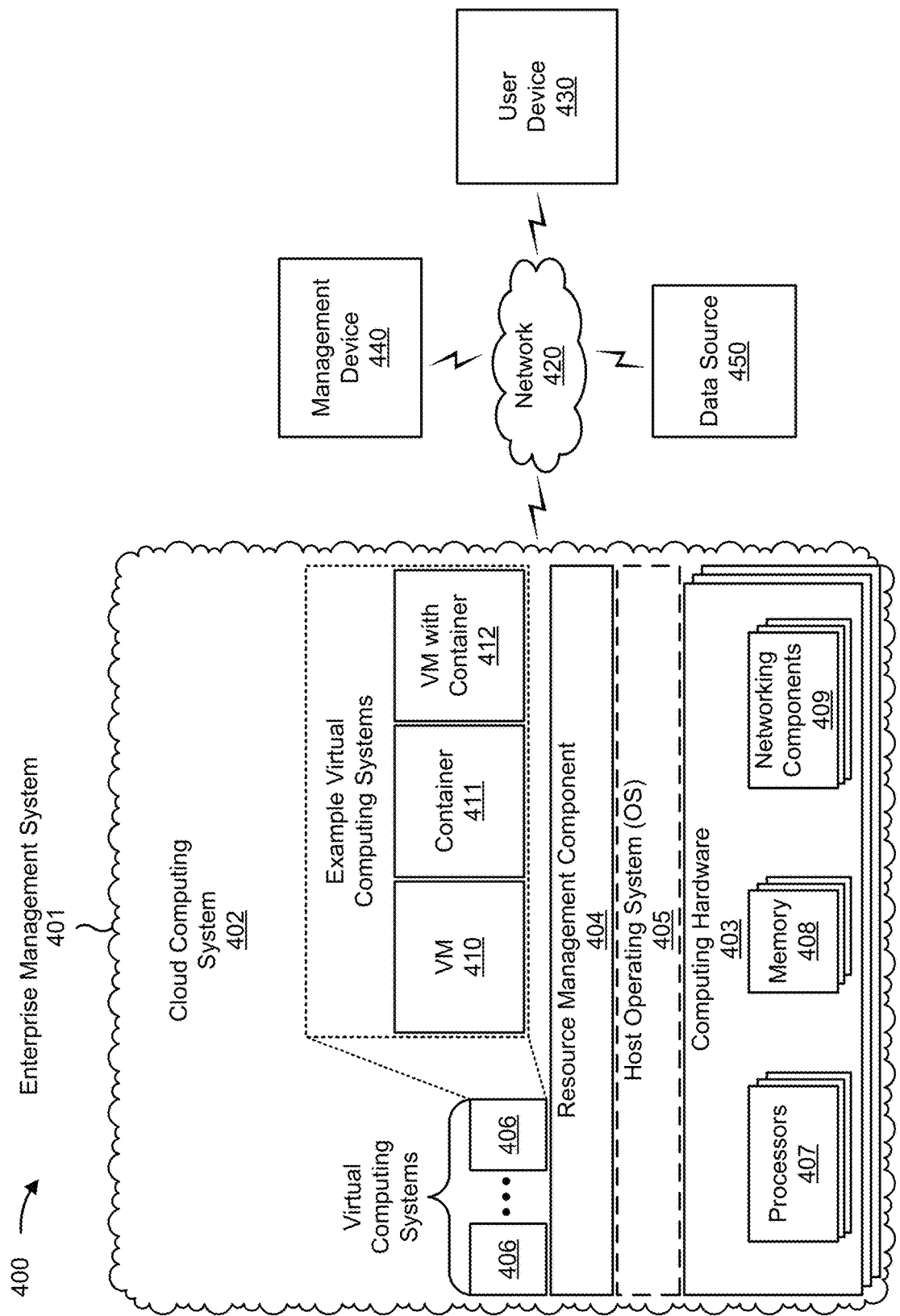
FIG. 4 is a diagram of an example environment in which systems and/or methods described herein may be implemented, and example components of one or more devices associated with the systems and/or methods described herein.

FIG. 4 is a diagram of an example environment 400 in which systems and/or methods described herein may be implemented. As shown in FIG. 4, environment 400 may include a enterprise management system 401, which may include one or more elements of and/or may execute within a cloud computing system 402. The cloud computing system 402 may include one or more elements 403-512, as described in more detail below. As further shown in FIG. 4, environment 400 may include a network 420, a user device 430, a management device 440, and a data source 450. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The cloud computing system 402 may execute on, for example, an Amazon Web Services platform, a Microsoft Azure platform, or a Snowflake platform. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, and/or one or more networking components 409. Examples of a processor, a memory, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 410. Additionally, or alternatively, the resource management component 404 may include a container manager, such as when the virtual computing systems 406 are containers 411. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 410, a container 411, or a hybrid environment 412 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the enterprise management system 401 may include one or more elements 403-412 of the cloud computing system 402, may execute within the cloud computing system 402, and/or may be hosted within the cloud computing system 402, in some implementations, the enterprise management system 401 may not be cloud-based (e.g., may be implemented outside of a cloud computing system) or may be partially cloud-based. For example, the enterprise management system 401 may include one or more devices that are not part of the cloud computing system 402, which may include a standalone server or another type of computing device. The enterprise management system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or a combination of these or other types of networks. The network 420 enables communication among the devices of environment 400.

The user device 430 includes one or more devices capable of receiving, generating, storing, processing, and/or providing information associated with an innovation that is analyzed by the enterprise management system 401, as described elsewhere herein. The user device 430 may include a communication device and/or a computing device. For example, the user device 430 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The management device 440 includes one or more devices capable of receiving, generating, storing, processing, and/or providing information associated with managing an innovation and/or a project that is analyzed and/or developed, respectively, as described elsewhere herein. The management device 440 may include a communication device and/or a computing device. For example, the management device 440 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The data source 450 includes one or more devices capable of receiving, generating, storing, processing, and/or providing information associated with analyzing an innovation and/or determining an impact of the innovation, a, as described elsewhere herein. The data source 450 may include a communication device and/or a computing device. For example, the data source 450 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data source 450 may communicate with one or more other devices of environment 400, as described elsewhere herein.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
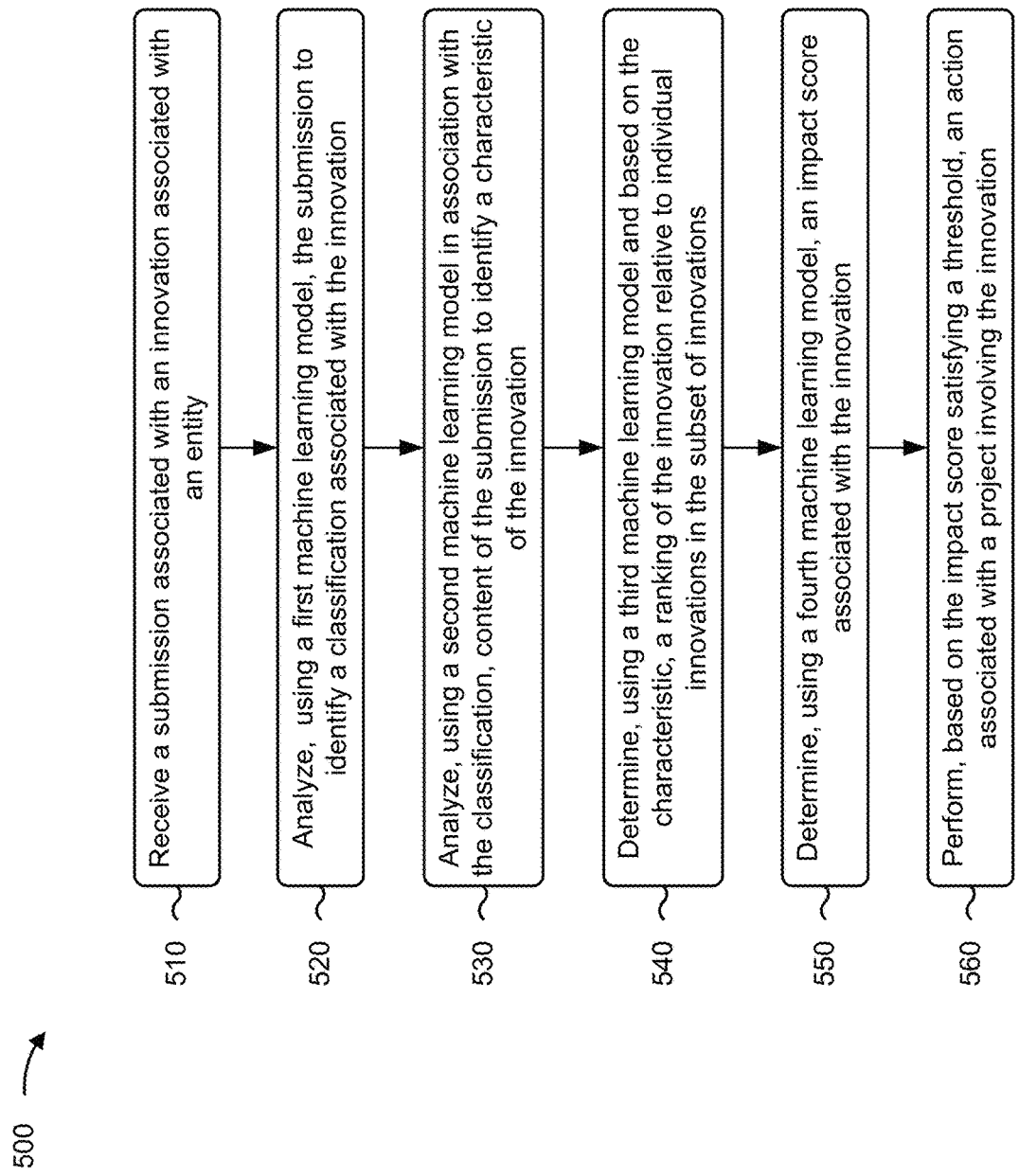
FIG. 5 is a flowchart of an example process relating to determining an impact of an innovation.

FIG. 5 is a flowchart of an example process 500 associated with determining an impact of an innovation associated with an enterprise. In some implementations, one or more process blocks of FIG. 5 are performed by an enterprise management system (e.g., the enterprise management system 401). In some implementations, one or more process blocks of FIG. 5 are performed by another device or a group of devices separate from or including the enterprise management system, such as a user device (e.g., the user device 430), a management device (e.g., the management device 440), and/or a data source (e.g., the data source 450). Additionally, or alternatively, one or more process blocks of FIG. 5 may be performed by d As shown in FIG. 5, process 500 may include receiving a submission associated with an innovation associated with an entity (block 510). For example, the enterprise management system may receive a submission associated with an innovation associated with an entity, as described above. The submission may include a description of the innovation (e.g., within one or more types of files, such as a document file, a text file, a media file, or the like). Additionally, or alternatively, the submission may be received within one or more fields of a user interface and/or online portal associated with the enterprise management system.

As further shown in FIG. 5, process 500 may include analyzing, using a first machine learning model, the submission to identify a classification associated with the innovation (block 520). For example, the enterprise management system may analyze, using a first machine learning model, the submission to identify a classification associated with the innovation, as described above. In some implementations, the first machine learning model is trained based on historical data associated with a plurality of innovations that are associated with the entity.

In some implementations, the historical data includes, for one or more of the plurality of innovations, information associated with the one of the plurality of innovations, historical project information associated with a historical project developed in association with the one of the plurality of innovations, and/or information associated with a development of the historical project. In some implementations, the first machine learning model is a classification model that is trained based on one or more types of innovations that are indicated, within a data structure, as being associated with the entity. The classification model may include a Naïve Bayesian model for categorizing unstructured data of the submission, a bagging model for generating one or more CARTs associated with the submission, or a random forest model associated with the one or more CARTs, and/or a bagging classifier model to fit base classifiers on subsets of the submission.

As further shown in FIG. 5, process 500 may include analyzing, using a second machine learning model in association with the classification, content of the submission to identify a characteristic of the innovation (block 530). For example, the enterprise management system may analyze, using a second machine learning model in association with the classification, content of the submission to identify a characteristic of the innovation, as described above. The second machine learning model may be trained based on a subset of the historical data that is associated with a subset of the plurality of innovations that are associated with the classification.

The second machine learning model may analyze, based on the classification, a description of the innovation with the submission using a natural language processing technique, a semantic analysis technique, and/or a sentiment analysis technique. The second machine learning model may include a content analysis model that is trained based on descriptions of a plurality of innovations that are associated with the entity.

The content analysis model may include a random forest model, a Naïve Bayesian model, a bag-of-words model, a feature extraction model, a vectorization model, and/or a neural network. More specifically, the content analysis model may include a feature extraction model for identifying features of the innovation described in the submission, a vectorization model to designate categories of the features for natural language processing, and/or a neural network to identify the characteristic based on a mapping of the features according to the categories.

As further shown in FIG. 5, process 500 may include determining, using a third machine learning model and based on the characteristic, a ranking of the innovation relative to individual innovations in the subset of innovations (block 540). For example, the enterprise management system may determine, using a third machine learning model and based on the characteristic, a ranking of the innovation relative to individual innovations in the subset of innovations, as described above.

As further shown in FIG. 5, process 500 may include determining, using a fourth machine learning model, an impact score associated with the innovation, wherein the impact score is determined based on the ranking and an impact parameter associated with the classification (block 550). For example, the enterprise management system may determine, using a fourth machine learning model, an impact score associated with the innovation, as described above. In some implementations, the impact score may be determined based on the ranking and an impact parameter associated with the classification. The impact parameter may be indicative of a weight that is used to determine the impact score.

As further shown in FIG. 5, process 500 may include performing, based on the impact score satisfying a threshold, an action associated with a project involving the innovation (block 560). For example, the enterprise management system may perform, based on the impact score satisfying a threshold, an action associated with a project involving the innovation, as described above.

The enterprise management system, to perform the action, may indicate, via a user interface, the impact score in association with an identifier of the project and/or provide, to another device (e.g., the user device and/or the management device), project information, associated with the project, that identifies the classification, the characteristic, the ranking, and the impact score.

Additionally, or alternatively, the enterprise management system may identify, based on the classification or the characteristic, a resource for developing the project. The enterprise management system may generate a report associated with the project that identifies the resource and/or other information associated with the innovation and may provide, to another device or the resource (e.g., a team member and/or an automated device, such as automated equipment, a computing device, or the like), the report to enable development of the project using the resource.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, a submission associated with an innovation associated with an entity,
      wherein the device comprises a first layer that interfaces with one or more second layers to generate a report based on one or more machine learning models, and
      wherein the device further comprises a third layer that is configured to be an interface with:
         an enterprise reference data structure from which historical data associated with a plurality of innovations, that are associated with the entity, are received, or
         a resource management data structure, for identifying available resources, that performs virtualization of computer hardware to create one or more virtual computing systems,
            wherein the virtualization creates a plurality of isolated virtual computing systems from the computer hardware that is associated with a single computing device;
   analyzing, by the device and using a first machine learning model, the submission to identify a classification associated with the innovation, wherein the first machine learning model is trained based on the historical data;
   analyzing, by the device and using a second machine learning model in association with the classification, content of the submission to identify a characteristic of the innovation, wherein the second machine learning model is trained based on a subset of the historical data that is associated with a subset of the plurality of innovations that are associated with the classification;
   determining, by the device and using a third machine learning model and based on the characteristic, a ranking of the innovation relative to individual innovations in the subset of innovations;
   determining, by the device and using a fourth machine learning model, an impact score associated with the innovation, wherein the impact score is determined based on the ranking and an impact parameter associated with the classification; and
   performing, by the device and based on the impact score satisfying a threshold, an action associated with a project involving the innovation.

2. The method of claim 1, wherein the historical data includes, for one or more of the plurality of innovations, at least one of:
   submission information associated with the one of the plurality of innovations,
   historical project information associated with a historical project developed in association with the one of the plurality of innovations, or
   resource information associated with a development of the historical project.

3. The method of claim 1, wherein the first machine learning model is a classification model that is trained based on one or more types of innovations that are indicated, within a data structure, as being associated with the entity.

4. The method of claim 3, wherein the classification model comprises at least one of:
   a Naïve Bayesian model for categorizing unstructured data of the submission,
   a bagging model for generating one or more classification and regression trees (CARTs) associated with the submission, or a random forest model associated with the one or more CARTs, or a bagging classifier model to fit base classifiers on subsets of the submission.

5. The method of claim 1, wherein the impact parameter is indicative of a weight that is used to determine the impact score.

6. The method of claim 1, wherein performing the action comprises at least one of:
indicating, via a user interface, the impact score in association with an identifier of the project, or
providing, to another device, project information, associated with the project, that identifies the classification, the characteristic, the ranking, and the impact score.

7. The method of claim 1, wherein performing the action comprises:
identifying, based on the classification or the characteristic, a resource for developing the project;
generating a report associated with the project that identifies the resource; and
providing, to another device or the resource, the report to enable development of the project using the resource.

8. A device, comprising:
one or more memories; and
one or more processors, coupled to the one or more memories, configured to:
receive a submission associated with an innovation associated with an entity,
wherein the device comprises a first layer that interfaces with one or more second layers to generate a report based on one or more machine learning models, and
wherein the device further comprises a third layer that is configured to be an interface with:
an enterprise reference data structure from which historical data associated with a plurality of innovations are received, or
a resource management data structure, for identifying available resources, that performs virtualization of computer hardware to create one or more virtual computing systems, wherein the virtualization creates a plurality of isolated virtual computing systems from the computer hardware that is associated with a single computing device;
analyze, using a first machine learning model, the submission to identify a classification associated with the innovation;
analyze, using a second machine learning model in association with the classification, content of the submission to identify a characteristic of the innovation;
determine, using a third machine learning model and based on the characteristic, a ranking of the innovation relative to a set of innovations;
determine, using a fourth machine learning model, an impact score associated with the innovation,
wherein the impact score is determined based on the ranking and an impact parameter associated with the classification; and
perform, based on the impact score satisfying a threshold, an action associated with a project involving the innovation.

9. The device of claim 8, wherein one or more of the first machine learning model, the second machine learning model, or the third machine learning model are trained based on historical data associated with a plurality of innovations that are associated with the entity.

10. The device of claim 8, wherein the first machine learning model is trained based on historical data associated with a plurality of innovations that are associated with the entity, and
wherein the second machine learning model is trained based on a subset of the historical data that is associated with a subset of the plurality of innovations that are associated with the classification.

11. The device of claim 8, wherein the submission comprises a description of the innovation, and
wherein the second machine learning model is configured to analyze, based on the classification, the description using a natural language processing technique, a semantic analysis technique, or a sentiment analysis technique.

12. The device of claim 8, wherein the second machine learning model comprises a content analysis model that is trained based on descriptions of a plurality of innovations that are associated with the entity.

13. The device of claim 12, wherein the content analysis model comprises at least one of:
a feature extraction model for identifying features of the innovation described in the submission,
a vectorization model to designate categories of the features for natural language processing, or
a neural network to identify the characteristic based on a mapping of the features according to the categories.

14. The device of claim 8, wherein the ranking is relative to other innovations that are associated with the classification and the entity.

15. The device of claim 8, wherein the threshold is associated with the classification, and wherein the one or more processors, to perform the action, are configured to at least one of:
indicate, via a user interface, the impact score in association with an identifier of the project, or
provide, to another device, project information, associated with the project, that identifies the classification, the characteristic, the ranking, and the impact score, or
generate a report associated with the project that identifies a resource for developing the project.

16. A non-transitory computer-readable medium storing a set of instructions, the set of instructions comprising:
one or more instructions that, when executed by one or more processors of a device, cause the device to:
receive a submission associated with an innovation associated with an entity,
wherein the device comprises a first layer that interfaces with one or more second layers to generate a report based on one or more machine learning models, and
wherein the device further comprises a third layer that is configured to be an interface with:
an enterprise reference data structure from which historical data associated with a plurality of innovations, that are associated with the entity, are received, or
a resource management data structure, for identifying available resources, that performs virtualization of computer hardware to create one or more virtual computing systems, wherein the virtualization creates a plurality of isolated virtual computing systems from the computer hardware that is associated with a single computing device;

determine, based on the submission, a classification of the innovation;

analyze, using a content analysis model and in association with the classification, the submission to identify a characteristic of the innovation;

determine, using an impact analysis model, an impact score associated with the innovation, wherein the impact score is determined based on:
 a ranking of the innovation relative to the plurality of innovations, and
 an impact parameter associated with the classification; and perform an action associated with the innovation.

17. The non-transitory computer-readable medium of claim 16, wherein the plurality of innovations are classified according to the classification.

18. The non-transitory computer-readable medium of claim 16, wherein the content analysis model comprises at least one of:
 a random forest model,
 a Naïve Bayesian model,
 a bag-of-words model,
 a feature extraction model,
 a vectorization model, or
 a neural network.

19. The non-transitory computer-readable medium of claim 16, wherein the one or more instructions, that cause the device to perform the action, cause the device to:
 indicate, via a user interface, the impact score in association with an identifier for a project associated with the innovation, or
 provide, to another device, project information, associated with the project, that identifies the classification, the characteristic, the ranking, and the impact score.

20. The non-transitory computer-readable medium of claim 16, wherein the one or more instructions, that cause the device to perform the action, cause the device to:
 identify, based on the classification or the characteristic, a resource for developing a project associated with the innovation;
 generate a report associated with the project that identifies the resource and other information associated with the innovation; and
 provide, to another device or the resource, the report to enable development of the project using the resource.

* * * * *